United States Patent [19]

Wong

[11] Patent Number: 4,940,758

[45] Date of Patent: Jul. 10, 1990

[54] POLYALCOHOL

[75] Inventor: Pui K. Wong, Amsterdam, Netherlands

[73] Assignee: Shell Oil Company, Houston, Tex.

[21] Appl. No.: 337,713

[22] Filed: Apr. 13, 1989

Related U.S. Application Data

[62] Division of Ser. No. 138,767, Dec. 29, 1987, Pat. No. 4,868,254.

[51] Int. Cl.$^5$ .............................................. C08G 67/02
[52] U.S. Cl. .................................... 525/539; 528/392; 528/425
[58] Field of Search ......................... 525/539; 528/425

[56] References Cited

U.S. PATENT DOCUMENTS

| | | | |
|---|---|---|---|
| 2,495,286 | 1/1950 | Brubaker | 260/63 |
| 2,495,292 | 1/1950 | Scott | 528/392 |
| 3,694,412 | 9/1972 | Nozaki | 260/63 |
| 4,513,117 | 4/1985 | Fries | 525/539 |

FOREIGN PATENT DOCUMENTS

| | | |
|---|---|---|
| 0121965 | 10/1984 | European Pat. Off. . |
| 0181014 | 5/1986 | European Pat. Off. . |
| 1081304 | 3/1965 | United Kingdom . |

OTHER PUBLICATIONS

Brubaker et al., J. Am. Chem. Soc. 74, 1509 (1952).
Morishima, European Polymer Journal, vol. 9, pp. 669–675 (1973).

*Primary Examiner*—Harold D. Anderson
*Attorney, Agent, or Firm*—Dean F. Vance

[57] ABSTRACT

A polymeric polyalcohol of high molecular purity is obtained by sodium borohydride reduction of a linear alternating copolymer of carbon monoxide and ethylene in a liquid-phase solution in hexafluoroisopropanol at ambient temperature and pressure.

5 Claims, No Drawings

POLYALCOHOL

This is a division of application Ser. No. 138,767, filed Dec. 29, 1987, now U.S. Pat. No. 4,868,254.

FIELD OF THE INVENTION

This invention relates to a process for the production of polymeric polyalcohols by hydrogenation of a linear alternating copolymer of carbon monoxide and ethylene. Moreover, the invention relates to novel polymeric polyalcohols of high molecular purity.

BACKGROUND OF THE INVENTION

The class of polymers of carbon monoxide and olefins has been known for a number of years. Brubaker, U.S. Pat. No. 2,495,286 produced such polymers of relatively low carbon monoxide content in the presence of free radical catalysts, e.g., peroxy compounds. U.K. No. 1,081,304 produced similar polymers of higher carbon monoxide content in the presence of alkylphosphine complexes of palladium salts as catalyst. Nozaki extended this process through the use of a number of arylphosphine complexes of palladium salts and certain inert solvents. See, for example, U.S. Pat. No. 3,694,412.

More recently, the class oi linear alternating polymers of carbon monoxide and at least one ethylenically unsaturated hydrocarbon, e.g., ethylene or ethylene and propylene, has become of greater interest in part because of the greater availability of these polymers. The polymers, generally known as polyketones, have a highly regular linear alternating structure of the formula —CO—(—A—)— wherein A is the moiety of the ethylenically unsaturated hydrocarbon polymerized through the ethylenic unsaturation. The general process for the production of such polymers is illustrated by a number of published European Patent Application Nos. including 0,121,965 and 0,181,014. The process typically involves a catalyst composition formed from a compound of the Group VIII metals palladium, cobalt or nickel, the anion of a non-hydrohalogenic acid having a pKa less than 2 and a bidentate ligand of phosphorus, arsenic or antimony.

When the polymer is a copolymer oi ethylene and carbon monoxide, the polymer chain is represented by repeating units of the formula

  I

The end groups or "caps" of the polymer chain will depend on what materials are present during the production of the polymer and whether and how the polymer was purified. The overall properties of the polymer are not greatly influenced by the nature of the end groups and the polymer is fairly represented by the polymer chain depicted above.

The polymer properties are greatly influenced by the molecular purity of the polymer which is herein intended to mean the extent to which the polymer consists of repeating units of the above formula I. It will be appreciated that the polymer of the above formula I is a polymer of carbon monoxide and ethylene in equimolar (as well as equal weight) quantities. Thus, a polymer of substantially lower carbon monoxide content cannot have a high molecular purity in terms of a single reoccurring unit. Alternatively, a polymer made by a relatively energetic means, e.g., by irradiation or by free radical catalysis, will not typically have a regular reoccurring structure even through the polymer may have carbon monoxide and ethylene present in a 1:1 molar ratio.

When copolymers of carbon monoxide and ethylene of low molecular purity are subjected to hydrogenation, either catalytic or stoichiometric, the resulting polymer is of generally less desirable properties due in part to the absence of crystallinity. For example, Scott, U.S. Pat. No. 2,495,292, reduces a polymer apparently similar to that of Brubaker over a nickel catalyst to obtain a pliable, rubbery material. Although the reduced polymer of Scott had a polyol content, there were unreacted carbonyl groups present. A similar polyol of unspecified properties produced by heterogeneous hydrogenation of a nonalternating polyketone is shown by Morishima et al, European Polymer Journal, Vol. 9, pp. 669-675 (1973).

A number of polyalcohol polymers are available which can be depicted as polymers of ethylene and the non-isolable vinyl alcohol. Because in part of a high molecular purity, these polymers have a number of desirable properties. The method of producing such polymeric polyalcohols causes the alcohols to be somewhat expensive. It would be of advantage to produce polymeric polyalcohols of good properties from copolymers of carbon monoxide and ethylene.

SUMMARY OF THE INVENTION

The present invention contemplates a class of polymeric polyalcohols of high molecular purity. The invention further contemplates a process of producing the polymeric polyalcohols by homogeneous reduction of polyketone polymers.

DESCRIPTION OF THE INVENTION

The class of polymeric polyalcohols produced according to the process of the invention is a polymer having units represented by the formula

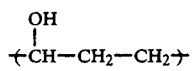  II wherein at least 90% of the atoms of the polymer chain are present in units of the above formula II and preferably at least 95% of the atoms of the polymer chain are in moieties of that formula. Thus, the polymer of the invention is said to have a molecular purity of at least 90%, preferably at least 95%. As previously stated, the end units or "caps" of the polymer chain are not of substantial value in determining the overall properties of the polymer and therefore are not considered for purposes of the determination of molecular purity.

The polymeric polyalcohol is produced according to the process of the invention by reduction oi a linear alternating copolymer of carbon monoxide and ethylene having units of formula I

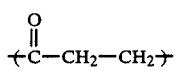

having a molecular purity of at least 95%, preferably at least 97%, in the linear alternating structure of formula I. The method of producing such polyketone polymers which is now becoming conventional is to contact the carbon monoxide and ethylene in the presence of a catalyst composition formed from a palladium salt, preferably a palladium carboxylate such as palladium acetate, the anion of a non-hydrohalogenic acid having a pKa below about 6, preferably below about 2, such as the anion of trifluoroacetic acid or p-toluenesulfonic acid and a bidentate ligand of phosphorus such as 1,3-(diphenylphosphino)propane or 1,3-bis[di(2-methoxyphenyl)phosphino]propane. Such a process for polyketone production is illustrated by published European Patent Application No. 0,121,965 and U.S. patent application Ser. No. 930,468, filed Nov. 14, 1986.

The reactants and catalyst are contacted by conventional methods such as shaking or stirring. Production of the polyketone is conducted under polymerization conditions of elevated temperature and pressure. Suitable reaction temperatures are from about 20° C. to about 135° C. with preferred temperatures being from about 50° C. to about 120° C. Typical reaction pressures vary from about 1 bar to about 200 bar with preferred pressures being from about 20 bar to about 100 bar. The polymerization is conducted in the gaseous phase or in the liquid phase in the presence of a reaction diluent, preferably a lower alkanol such as methanol or ethanol. Subsequent to polymerization the polymer product is recovered by filtration, decantation or other conventional methods. The polymer will on occasion contain residues of the catalyst which may be removed if desired by contact with a solvent which is selective for the residues.

Of particular interest are the polyketone polymers of molecular weight from about 1,000 to about 200,000, particularly those of molecular weight from about 10,000 to about 50,000. The polymer will contain substantially equimolar amounts of carbon monoxide and ethylene in the reoccurring unit of formula I in order to have the specified molecular purity and will typically melt about 260° C.

The polyketone polymer is reduced, i.e., hydrogenated, to a polymeric polyalcohol of formula II by reaction with sodium borohydride in solution in hexafluoroisopropanol. In contrast with earlier hydrogenations of similar but not linear alternating copolymers of carbon monoxide and ethylene (Morishima et al, *European Polymer J.*, 9, 669 (1973)) the homogeneous reduction of the linear alternating polymer gives a high conversion to the corresponding polyalcohol of the above formula II of high molecular purity. Reduction with sodium borohydride of a polymer suspended in a diluent such as methanol will typically afford only about 40–66% reduction of the carbonyl groups when a linear alternating copolymer is used. The polyalcohol product is therefore of relatively low molecular purity because of the substantial presence of units of both formula I and formula II.

The reduction of the polyketone copolymer of carbon monoxide and ethylene, according to the process of the invention, is typically conducted by dissolving the polymer in hexafluoroisopropanol, adding the sodium borohydride and maintaining the mixture in the liquid phase at or about ambient temperature or lower until the reaction is complete. The amount of sodium borohydride to be used is at least stoichiometric. Although the stoichiometry of a reaction involving a polymeric material is often difficult to determine, good results are obtained if at least 1.5 gram, preferably at least 2 grams, of sodium borohydride is employed for each gram of polyketone to be reduced. Use of a stoichiometric excess of sodium borohydride, even a substantial stoichiometric excess, is not detrimental to the reduction process but is often unnecessary. Typical reaction temperatures are from about 15° C. to about 40° C. and typical reaction pressures are those necessary to maintain the reaction mixture in the liquid phase, preferably at atmospheric pressure. Subsequent to reaction the polymeric polyalcohol is recovered as by solvent removal through evaporation or distillation or by precipitation of the polyalcohol with a material which is miscible with the hexafluoroisopropanol but which is a non-solvent for the polyalcohol, e.g., acetone. The polymeric polyalcohol product is used as such or is purified by conventional means including dissolving the polyalcohol in a hydroxylic solvent such as methanol and precipitating the polyalcohol through the addition of a non-solvent such as acetone.

The polyalcohol product is of high molecular purity and has units represented by the above formula II. The polyalcohol is related to the family of polyvinylalcohol polymers and copolymers differing in the number of carbon atoms per hydroxyl group in the repeating polymer chain unit. The polyalcohol of the invention enjoys many of the same applications of the conventional polyvinylalcohol materials but somewhat greater stability because of the structural inability to degrade to conjugated dienes. The polyalcohol product is cast or extruded into films which are useful as adhesives and coatings for paper and shows some degree of barrier properties which make the polyalcohols useful in multilayer laminates for wraps and containers for foods, drugs and cosmetics which normally undergo oxidative deterioration when exposed to air.

The invention is further illustrated by the following Illustrative Embodiments and Comparative Experiments (not of the invention) which should not be construed as limiting.

ILLUSTRATIVE EMBODIMENT I

A linear alternating copolymer of carbon monoxide and ethylene was produced using a catalyst composition formed from palladium acetate, the anion of trifluoroacetic acid and 1,3-bis(diphenylphosphino)propane. The melting point of the polymer was 257° C. and the limiting viscosity number (LVN) was 1.1 measured at 100° in m-cresol.

ILLUSTRATIVE EMBODIMENT II

A 10 g sample of the polymer of Illustrative Embodiment I was dissolved in 250 ml of hexafluoroisopropanol and sufficient sodium borohydride, dissolved in ethanol, was added with stirring to provide 2.4 g of sodium borohydride per gram of polymer. The mixture was maintained at ambient temperature overnight without stirring. Approximately 400 mls of water was added, followed by the slow addition of about 175 mls of concentrated hydrochloric acid, and then another 400 mls of water. The solution was evaporated to remove excess liquid and the insoluble polymeric polyalcohol precipitate was removed. The polymeric polyalcohol precipitate was then purified by repeated precipitation from methanol by the addition of acetone.

The polymer product was shown by NMR to be of the regular repeating formula

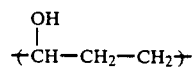

with no more than about 3-6% oi the units being of any other structure. The observed molecular impurities were indicated by NMR to be of a substituted 2,5-tetrahydrofuran structure, likely obtained by internal condensation of the polyketone polymer. A periodic acid titration of the polyalcohol product showed no detectable amount (less than 0.5%) of 1,2-glycol moieties which would have come from reduction of a 1,2-diketone structure in the polyketone polymer reactant.

The polyalcohol product showed a melting point of 117° C. The product is somewhat crystalline with a slow rate of crystallization. It is readily soluble in methanol and slowly soluble in hot ethylene glycol. The pclyalcchol product is insoluble in hot or cold water but is hydroscopic in air.

COMPARATIVE EXAMPLE I

When the general procedure of Illustrative Embodiment II was repeated, except that the reduction was conducted in hexafluoroisopropanol at reflux, a non-crystalline, rubbery material was obtained.

COMPARATIVE EXAMPLE II

When the general procedure of Illustrative Embodiment II was repeated by adding an ethanolic solution of sodium borohydride to a suspension of polyketone in methanol, the conversion of carbonyl groups was from 40-66% depending upon the amount of excess sodium borohydride added.

What is claimed is:

1. The polymeric polyalcohol represented by repeating units having the formula

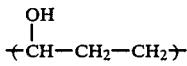

having a molecular purity of at least 90% as measured by Nuclear Magnetic Resonance and less than 0.5% 1,2-glycol moieties as measured by periodic acid titration.

2. The polyalcohol of claim 1 having a molecular purity of at least 95%.

3. The polyalcohol of claim 1 having a melting point of 117° C.

4. Film prepared by extruding the composition of claim 1.

5. The polyalcohol of claim 1 having a partially crystalline structure.

* * * * *